United States Patent [19]
Taber et al.

[11] Patent Number: 5,731,886
[45] Date of Patent: Mar. 24, 1998

[54] BIREFRINGENT COMPENSATOR FOR REFLECTIVE POLARIZERS

[75] Inventors: Donald B. Taber, Thousand Oaks; William J. Gunning, III, Newbury Park, both of Calif.

[73] Assignee: Rockwell International Corporation, Seal Beach, Calif.

[21] Appl. No.: 535,799

[22] Filed: Sep. 28, 1995

[51] Int. Cl.⁶ .................................................. G02F 1/1335
[52] U.S. Cl. ............................ 359/65; 359/499; 359/73
[58] Field of Search .................................. 359/63, 65, 73, 359/494, 499, 37, 101

[56] References Cited

U.S. PATENT DOCUMENTS

| | | | |
|---|---|---|---|
| 5,235,443 | 8/1993 | Barnik et al. | 359/37 |
| 5,319,478 | 6/1994 | Funfschilling | 359/53 |
| 5,486,935 | 1/1996 | Kalmanash | 359/65 |
| 5,506,704 | 4/1996 | Broer et al. | 359/65 |

FOREIGN PATENT DOCUMENTS

| | | | |
|---|---|---|---|
| 0606940A2 | 7/1994 | European Pat. Off. | G02B 5/30 |
| 4-179923 | 6/1992 | Japan | 359/37 |

Primary Examiner—William L. Sikes
Assistant Examiner—James A. Dudek
Attorney, Agent, or Firm—John Veldhuis-Kroeze; Gregory G. Williams; M. Lee Murrah

[57] ABSTRACT

An optical device for transforming light and an associated liquid crystal display is disclosed. The device includes a layer of cholesteric material of the type which transmits light having a first circular helicity and reflects light having a second circular helicity. A quarter-wave plate positioned on a first side of the layer of cholesteric material converts the transmitted light having the first circular helicity into linearly polarized light. A compensator including a positively birefringent C-plate layer is disposed between the layer of cholesteric material and the quarter-wave plate. The compensator reduces undesirable phase effects in the transmitted light introduced by the layer of cholesteric material. The disclosed LCD employs the optical device to increase backlighting efficiency while improving field of view and chromaticity of the display.

17 Claims, 7 Drawing Sheets

BIREFRINGENT COMPENSATOR FOR REFLECTIVE POLARIZERS

CROSS REFERENCES TO RELATED APPLICATIONS

The following published patents and patent applications are herein incorporated by reference: European Patent Application No. 94200026.6 of Phillips Electronics N. V., entitled "Cholesteric Polarizer and the Manufacture Thereof", publication number 0 606 940 A2, publication date Jul. 20, 1994; U.S. Pat. No. 5,319,478 assigned to Hoffmann-La Roche, Inc., entitled, "Light Control Systems With A Circular Polarizer And A Twisted Nematic Liquid Crystal Having A Minimum Path Difference of λ/2"; and U.S. Pat. No. 5,235,443 assigned to Hoffman-La Roche, Inc., entitled, "Polarizer Device."

BACKGROUND OF THE INVENTION

The present invention relates to liquid crystal displays (LCDs). More specifically, the invention relates to reflective polarizer devices which can be used in conjunction with LCDs.

Liquid crystals (LCs) are useful for electronic displays because polarized light traveling through an LC layer is affected by the layer's birefringence, which can be changed by the application of a voltage across the layer. By using this effect, the transmission or reflection of light from an external source can be controlled with much less power than is required for the luminescent materials used in other types of displays. To provide the LC layer the necessary source of plane polarized light, LCD's typically include a light source which produces randomly or unpolarized light and a polarizer which filters the randomly polarized light to provide plane polarized light. During the process of providing appropriately polarized light to the LC layer, the polarizer absorbs about 50% of the incident randomly polarized light. This initial 50% loss of backlighting energy results in a reduction of LCD performance.

A backlighting device known in the art which includes a cholesteric polarizer, a quarter-wave plate and a polarizer can be used to mitigate the initial loss of light typical at conventional LCD polarizers. A device of this type is sometimes referred to as a reflective polarizer. Examples and discussions of cholesteric polarizer and reflective polarizer devices is provided in published European Patent Application 94200026.6 of Phillips Electronics N. V., entitled "Cholesteric Polarizer and the Manufacture Thereof", publication number 0 606 940 A2, which is herein incorporated by reference. When used in an LCD in conjunction with a light source and a reflector, reflective polarizers can be positioned between the light source and the LCD to increase the percentage of light which passes through the polarizer for use in backlighting the LCD. In this respect, reflective polarizer devices generally function as described below. Randomly polarized light from the light source hits the cholesteric layer of the cholesteric polarizer. The cholesteric layer transmits light having a first circular helicity, while reflecting light having a second circular helicity. The first and second circular helicities are also referred to as left circularly polarized (LCP) light and right circularly polarized (RCP) light. Light having the first circular helicity (either LCP or RCP) is transmitted through the cholesteric layer and subsequently passes through the quarter-wave plate. The quarter-wave plate converts this circularly polarized light into linearly polarized light which is oriented such that the linear output lines up with the polarizer so that all of the light which passes through the cholesteric layer passes through the polarizer for use in illuminating the LCD.

The light having the second circular helicity which is reflected by the cholesteric layer strikes a reflector. The reflector reflects the light back toward the cholesteric layer. If the reflector were perfectly specular, the reflected light would have its helicity completely reversed so that it would be entirely transmitted through the cholesteric layer on its second pass. However, in practice the reflector will not be perfectly specular and some portion of the light will not be reflected with the first circular helicity. This portion will again be reflected by the cholesteric layer. As the process is repeated, with each pass of the light toward the cholesteric layer, a higher percentage of the total radiated light will have been transmitted through the cholesteric layer and will have successfully been phase transformed to plane polarized light by the reflective polarizer.

Although cholesteric polarizer or reflective polarizer devices provide the above described advantages, use of these devices introduces some significant problems. One problem caused by the use of these devices is chromaticity shifting of light which passes through the cholesteric layer at oblique angles. Light which passes through the cholesteric layer at oblique angles relative to the normal to the surface of the layer undergoes different phase effects than light which passes through the film at normal incidence. These phase effects reduce the field of view and alter coloration of the LCD.

SUMMARY OF THE INVENTION

It is an object of the present invention to provide a compensated reflective polarizer device which substantially eliminates undesirable phase effects introduced by the cholesteric layer in obliquely incident light. It is a further object of the present invention to provide an LCD having high backlighting efficiency and a wide field of view. It is yet another object of the present invention to provide an LCD having high backlighting efficiency and reduced chromaticity shifting over the field of view.

The present invention is a compensated reflective polarizer and an associated LCD. The device includes a layer of cholesteric material of the type which transmits light having a first circular helicity and reflects light having a second circular helicity. A quarter-wave plate positioned on a first side of the layer of cholesteric material converts the transmitted light having the first circular helicity into linearly polarized light which can be aligned to pass through a polarizer. The polarizer can be an integral component of the compensated reflective polarizer of the present invention, or it can be a separate polarizer used in conjunction with the reflective polarizer of the present invention and an LCD. Further, an LCD compensator of the type known in the art for improving contrast and/or color and gray level stability at wide viewing angles can also be an integral component of the compensated reflective polarizer of the present invention, or it can be a separate LCD compensator used in conjunction with the present invention.

In embodiments of the present invention, a compensator including a positively birefringent C-plate layer is disposed between the layer of cholesteric material and the quarter-wave plate. The compensator reduces undesirable phase effects in the transmitted light introduced by the layer of cholesteric material. The disclosed LCD employs the optical device to increase backlighting efficiency while improving field of view and chromaticity of the display.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE PREFERRED EMBODIMENTS

The present invention is a compensated cholesteric polarizer or reflective polarizer and an associated LCD which employs the compensated cholesteric or reflective polarizer. The compensated reflective polarizer of the present invention provides the increased backlighting efficiency of known reflective polarizers, while simultaneously providing improved field of view and more stable chromaticity. Computer modeling was used to confirm the invention's improved performance over prior art reflective polarizers.

Figure 1:
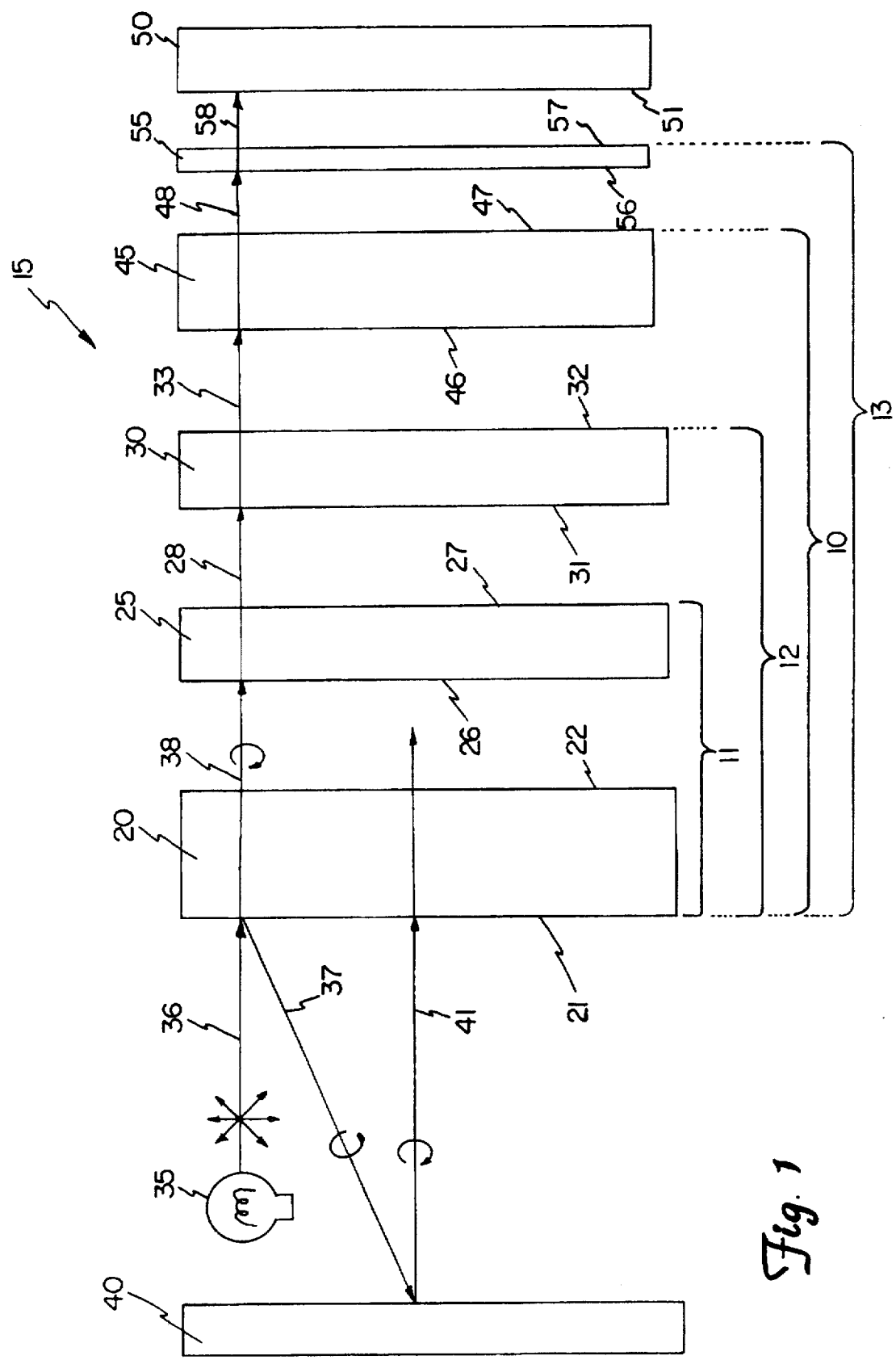
FIG. 1 is a diagrammatic view illustrating a compensated cholesteric or reflective polarizer and an LCD which employs the compensated reflective polarizer in accordance with preferred embodiments of the present invention.

FIG. 1 is a diagrammatic view illustrating a compensated reflective polarizer integrated with an LCD in accordance with preferred embodiments of the present invention. Compensated reflective polarizer 10 is particularly adapted for efficiently supplying linearly polarized light in an LCD application. However, use of device 10 is not limited to LCDs.

In preferred embodiments, compensated reflective polarizer 10 includes cholesteric layer 20, compensator 25, quarter-wave plate 30 and polarizer 45. LCD 15 includes device 10, backlight 35, reflector 40, LC matrix 50 and optionally display compensator 55. It is noted that in the art, there is the potential for nomenclature differences as to whether quarter-wave plate 30, polarizer 45 and display compensator 55 are components of the reflective polarizer, or whether they are simply used with the reflective polarizer. Some or all of these components can be included in a single compensated reflective polarizer film or device which can be applied as a whole to surface 51 of LCD matrix 50. Therefore, note that in other embodiments, the present invention can be referred to as a compensated cholesteric polarizer and can include just cholesteric layer 20 and compensator 25 as shown at 11. In other embodiments, the present invention includes cholesteric layer 20, compensator 25 and quarter-wave plate 30 as shown at 12. Finally, in yet other embodiments, the present invention includes cholesteric layer 20, compensator 25, quarter-wave plate 30, polarizer 45 and display compensator 55, as shown at 13.

While any of embodiments 10, 11, 12 and 13 can be the preferred embodiment for a specific LCD application, compensated reflective polarizer 10 is herein referred to as the preferred embodiment for ease of illustration. It is therefore assumed that compensated reflective polarizer 10 is used in conjunction with display compensator 55 and LC matrix 50 to form LCD 15. However, note that display compensator 55 is optional and can be omitted. In all of these embodiments, the present invention uses compensator 25 to provide compensation for reducing undesirable phase effects in light transmitted through cholesteric layer 20.

Backlight 35 can be any type of light source suitable for producing randomly polarized light 36 for use in backlighting LC matrix 50 of LCD 15. For example, backlight 35 can include one fluorescent bulb in a serpentine configuration to facilitate the provision of a substantially even source of light over a wide area. Although backlight 35 is illustrated graphically as a single bulb, backlight 35 is intended to be any of the type known in the art which can supply light 36 to most or all of first surface 21 of cholesteric layer 20. Randomly polarized light 36 provided by backlight 35 includes light having a first circular helicity and light having a second circular helicity. As commonly referred to in the art, the light having the first and second circular helicities can alternatively be described, in no particular order, as being left circularly polarized (LCP) light and right circularly polarized (RCP) light.

Cholesteric layer 20 is a layer of cholesteric material which reflects light 37 from backlight 35 having one circular helicity (LCP or RCP) while transmitting light 38 from backlight 35 having the other circular helicity (RCP or LCP). In FIG. 1, reflected light 37 is shown to be LCP light and transmitted light 38 is shown to be RCP light. Cholesteric layer 20 has a first side 21 oriented toward backlight 35 and a second side 22 oriented in a direction away from backlight 35. In preferred embodiments, cholesteric layer 20 is a gradient pitch cholesteric layer. The gradient pitch allows cholesteric layer 20 to work over essentially the entire visible spectrum. Cholesteric layers of this type are discussed in detail in published European Patent Application No. 94200026.6 of Phillips Electronics N. V., entitled "Cholesteric Polarizer and the Manufacture Thereof", publication number 0 606 940 A2, publication date Jul. 20, 1994. Alternatively, cholesteric layer 20 can be a structure having multiple discrete layers, each with a different cholesteric pitch whose values are chosen to provide continuous broad band reflection in the visible spectrum.

Compensator 25 is a layer of positively birefringent material with its C-axis oriented normal to surfaces of the layer. Compensator 25 is also referred to herein as a positively birefringent C-plate. A C-plate is a uniaxial birefringent plate with its extraordinary (i.e., its optic or C-axis) perpendicular to the surface of the plate (parallel to the direction of normally incident light). For the preferred embodiment, it is contemplated that a layer of homeotropically oriented LC molecules will be utilized as the positively birefringent C-plate material for compensator 25. The film may be fabricated by polymerizing a layer of homeotropically oriented nematic LC molecules. It is known that this symmetry of LC molecules exhibits positive birefringent C-plate properties. Compensator 25 has a first side 26 and a second side 27, with first side 26 oriented toward and positioned adjacent second side 22 of cholesteric layer 20 so that light 38 transmitted through cholesteric layer 20 strikes first side 26 prior to entering compensator 25. Compensator 25 transmits light 28 which has been compensated to correct for undesirable phase effects introduced in light 38 transmitted by cholesteric layer 20. Operation of compensator 25 is discussed below in greater detail.

Quarter-wave plate 30 is a birefringent optical element of a type well known in the art which introduces a relative phase shift between the constituent orthogonal o- and e-components of light 33 passing therethrough from compensator 25. The 90 degree phase shift introduced by quarter-wave plate 30 converts elliptically polarized light 28 to linearly polarized light 33. Quarter-wave plate 30 has a first side 31 oriented toward and positioned adjacent to second side 27 of compensator 25 such that light 28 transmitted through compensator 25 strikes first side 31 prior to entering quarter-wave plate 30. Second side 32 of quarter-wave plate 30 is oriented in a direction such that it faces away from compensator 25.

Polarizer 45 is a linear polarizer of the type well known in the art. Polarizer 45 has a first side 46 and a second side 47, with first side 46 oriented toward and positioned adjacent to second side 32 of quarter-wave plate 30. Second side 47 is oriented in a direction opposite to first side 46. The characteristics of polarizer 45 are chosen so that most or substantially all of linearly polarized light 33 transmitted by quarter-wave plate 30 will transmitted through polarizer 45 as plane polarized light 48. If quarter-wave plate 30 were not present to linearly polarize the light, polarizer 45 would block the transmission of approximately 50 percent of the light transmitted through cholesteric layer 20 and compensator 25.

Display compensator 55 is optional and can be any of a variety of different compensating films or structures for improving contrast and/or color and gray level stability at wide viewing angles. Display compensator 55 has a first side 56 and a second side 57, with first side 56 oriented toward and positioned adjacent to second side 47 of polarizer 45. Second side 57 is oriented in a direction opposite to the first side 56. Display compensator 55 receives plane polarized light 48 and transmits light 58 compensated such that the LCD will have improved performance at wide viewing angles. In embodiments of the present invention without display compensator 55, plane polarized light 48 would be received by LC matrix 50 without further compensation.

Reflector 40 can be any commercially available reflector which receives LCP or RCP polarized light 37 and reflects light 41 at least partially with reversed helicity (to RCP or LCP light, respectively). Although backlight 35 and reflector 40 have been shown and described as discrete components, they can be replaced with other backlighting configurations including edge-lit backlight reflector type devices. Further, they can also incorporate a diffuser between the backlight/ reflector assembly and the rest of LCD assembly 15. LC matrix 50 can be any of a wide variety of liquid crystal devices which require backlighting to display information represented on the device. LC matrix 50 has a first side 51 positioned adjacent to second side 57 of display compensator 55.

As is known in the art, uncompensated reflective polarizers (i.e., reflective polarizers without compensator 25) can be positioned between backlight 40 and LC matrix 50 to increase the percentage of the light which travels through the LC matrix. In accordance with preferred embodiments of the present invention, reflective polarizer 10 (or alternatively, reflective polarizer including devices 11, 12 or 13) can similarly be positioned between backlight 35 and LC matrix 50 to increase the percentage of light which passes through the LC matrix while simultaneously correcting undesirable phase effects introduced by cholesteric layer 20. In this respect, device 10 and LCD 15 generally function as follows.

Randomly polarized light 36 from backlight 35 hits surface 21 of cholesteric layer 20. Cholesteric layer 20 transmits light 38 having a first circular helicity (for example RCP light), while reflecting light 37 having a second circular helicity (for example LCP light). Light 37 which is reflected by cholesteric layer 20 strikes reflector 40. Reflector 40 reflects light 41 back toward cholesteric layer 20 such that its helicity has been substantially reversed to the first circular helicity. The portion having the first circular helicity will now pass through cholesteric layer 20.

Although cholesteric layer 20 transmits all light having the correct circular polarization, cholesteric layer 20 effects different transmitted light rays differently, depending on the angle of incidence of the light rays. Light which passes through cholesteric layer 20 at oblique angles relative to the normal to surface 21 undergoes different phase effects than light which passes through the film at normal incidence. To normally incident light having the correct circular helicity, cholesteric layer 20 appears isotropic. However, to light propagating through cholesteric layer 20 at off-normal angles, cholesteric layer 20 does not appear isotropic. Light propagating through the layer at off-normal angles appears in two modes due to the birefringence of the layer; a phase delay is introduced between those modes and increases with the incident angle of the light. This phase dependence on incidence angle introduces an ellipticity to the polarization state. The resulting phase effects ultimately reduce the field of view and cause chromaticity shifting which alters coloration of the LCD.

To compensate for the difference in phase effects undergone by obliquely incident light as compared to normally incident light, it has been found that compensator 25 must have C-plate symmetry, with positive birefringence. To light which is transmitted therethrough, cholesteric layer 20 appears to have the optical characteristics of a negatively birefringent C-plate (a negative C-plate). A negative C-plate is a device that has its smaller optic axis normal to the plane of the layer and its larger optic axis parallel to the plane of the layer. With positive C-plate symmetry, compensator 25 will introduce a phase delay opposite in sign to the phase delay caused by cholesteric layer 20, thereby restoring the original polarization state of the light.

Quarter-wave plate 30 converts the compensated circularly polarized light into linearly polarized light which is oriented such that the linear output lines up with polarizer 45 so that all of the light which passes through cholesteric layer 20 also passes through the polarizer for use in illuminating LC matrix 50. By compensating for the phase delay introduced in light transmitted by cholesteric layer 20, compensator 25 has been shown in computer simulations, to widen the field of view of LCD 15 and to stabilize the chromaticity over the field of view. Display compensator 55 can also be included to further improve contrast and/or color and gray level stability at wide viewing angles.

Figure 2:
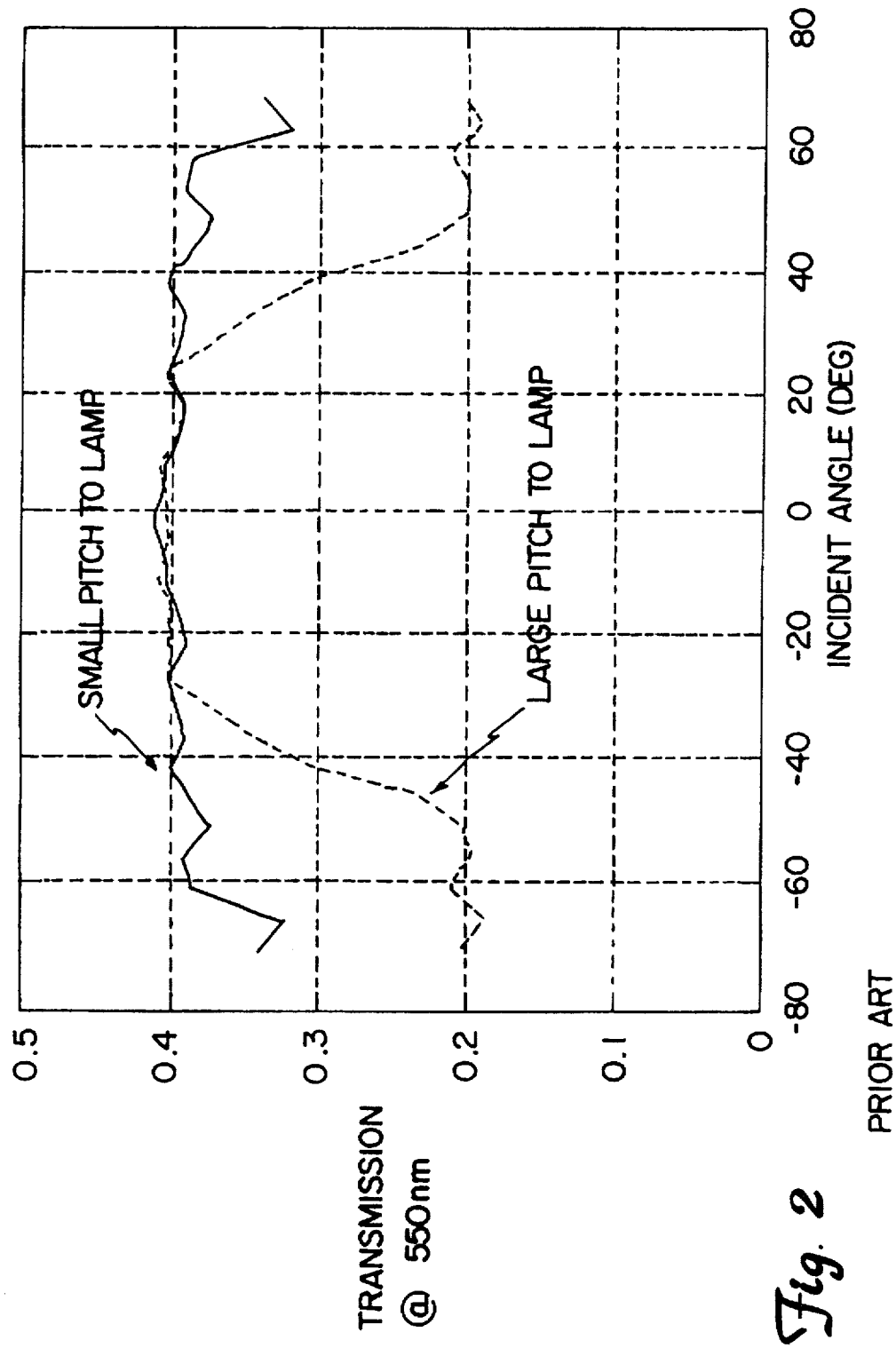
FIG. 2 is a plot showing computer modeled calculations of transmission versus incidence angle of two prior art reflective polarizers, and which illustrates the effect of the orientation of the pitch gradient on the field of view.
Figure 3:
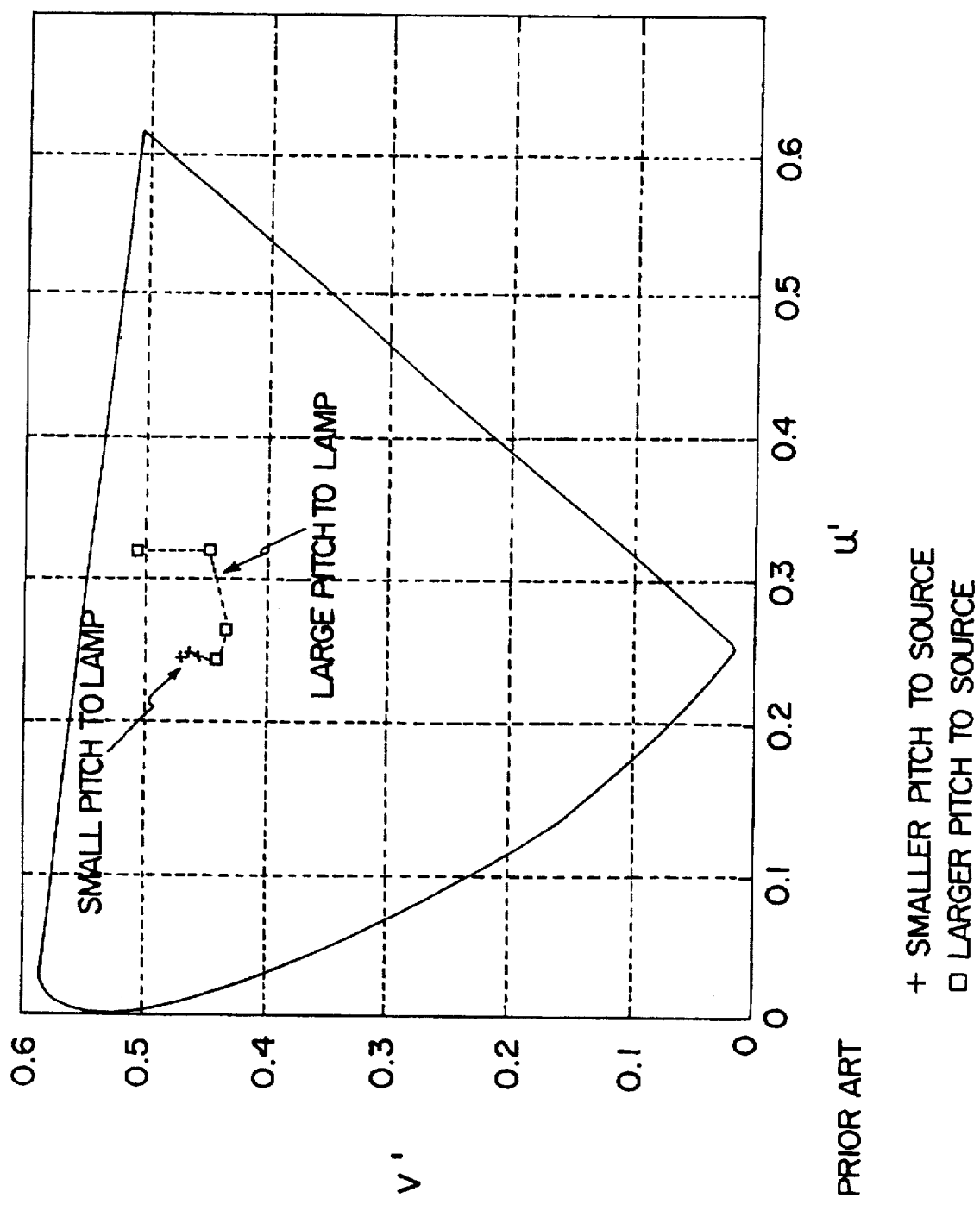
FIG. 3 is a plot showing computer modeled trajectories of the u', v' color coordinates for two prior art reflective polarizers, and which illustrates the effect of the orientation of the pitch gradient on chromaticity stability over the field of view.

The computer simulations utilized Berreman's 4×4 algorithm for the propagation of optical waves through layered media. Berreman's 4×4 algorithm is discussed in detail in an article entitled "Optics in Stratified and Anisotropic Media: 4×4-Matrix Formulation" in the Journal of the Optical Society of America, Volume 62, Number 4, Apr. 1972. FIGS. 2 and 3 illustrate modeled performance of prior art uncompensated reflective polarizers. FIGS. 4A, 4B, 5A and 5B illustrate modeled comparisons of prior art reflective polarizers versus the compensated reflective polarizers of the present invention.

FIG. 2 is a plot showing computer modeled calculations of transmission versus light incident angle for a prior art uncompensated reflective polarizer which illustrates the effect of pitch gradient on the field of view. The plot of FIG. 2 is for a reflective polarizer in which the cholesteric layer has a large or longer pitch of 0.402 μm and a small or shorter pitch of 0.260 μm. When the shorter pitch side is oriented toward the lamp, the transmission remains high even at large incident angles. When the longer pitch side is toward the lamp, transmission falls off rapidly past an incident angle of 30°. This demonstrates that the orientation of the pitch gradient has a strong effect on the field of view.

The pitch gradient also has a strong effect on the chromaticity of the device. FIG. 3 shows modeled trajectories of the u', v' color coordinates for an uncompensated reflective polarizer as the light incident angle is increased from normal to 60°. As can be seen from the modeled trajectories, the chromaticity is much more stable when the shorter pitch side is oriented toward the light source.

For transmitted light, a cholesteric layer appears to be negatively birefringent with its C-axis normal to the plane of the layer. The present invention includes a technique for fixing unwanted chromatic shifts in polarizer devices by inserting a positively birefringent C-plate between the cholesteric layer and the quarter-wave plate to reverse the phase effects the cholesteric layer has on off normal light. Computer simulations show this to be an effective strategy.

Figure 4A:
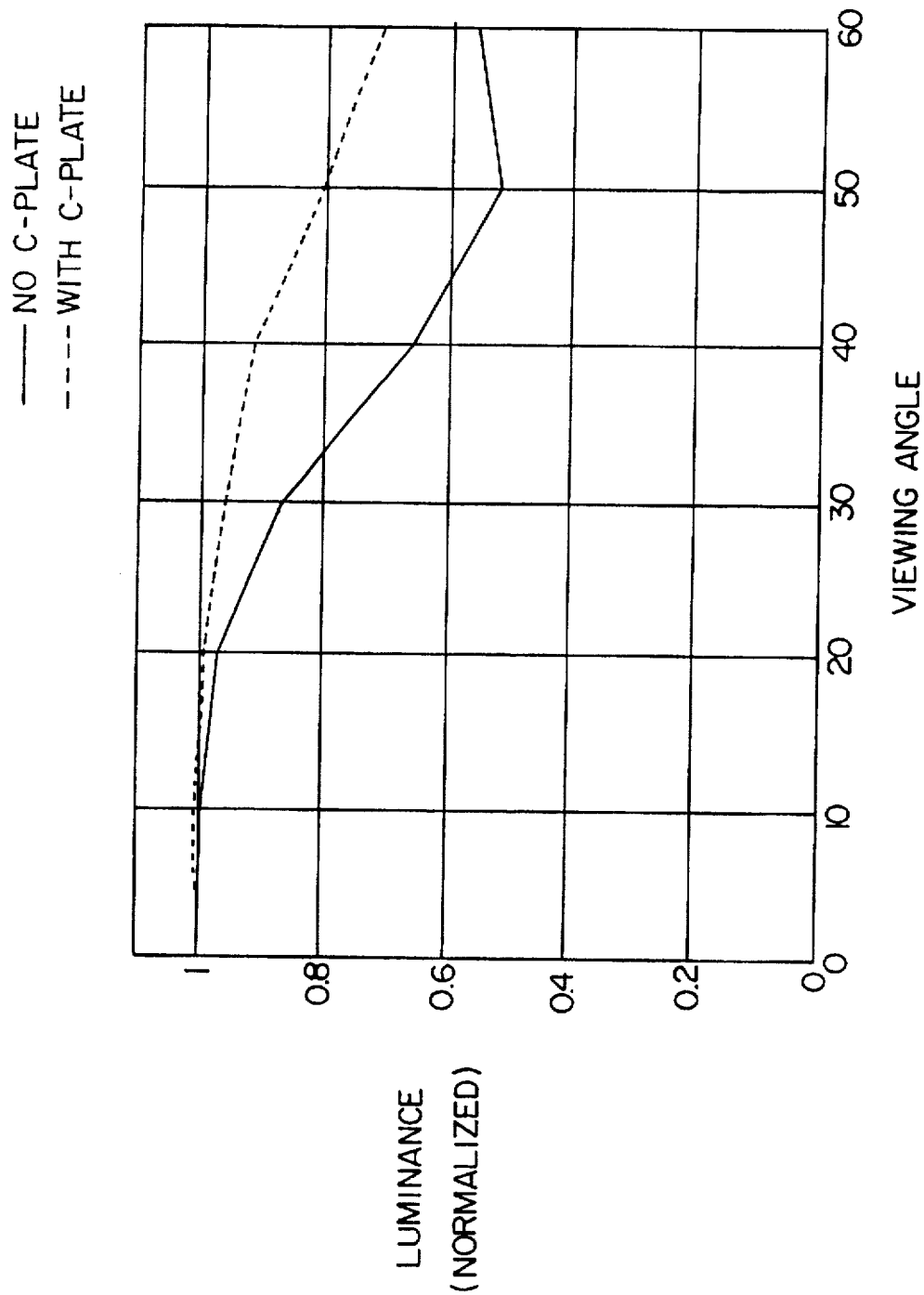
FIG. 4A is a plot comparing computer modeled calculations of transmission versus viewing angle for a reflective polarizer, having the side of the film having its longer pitch oriented toward the light source, both with and without a positively birefringent C-plate added.
Figure 4B:
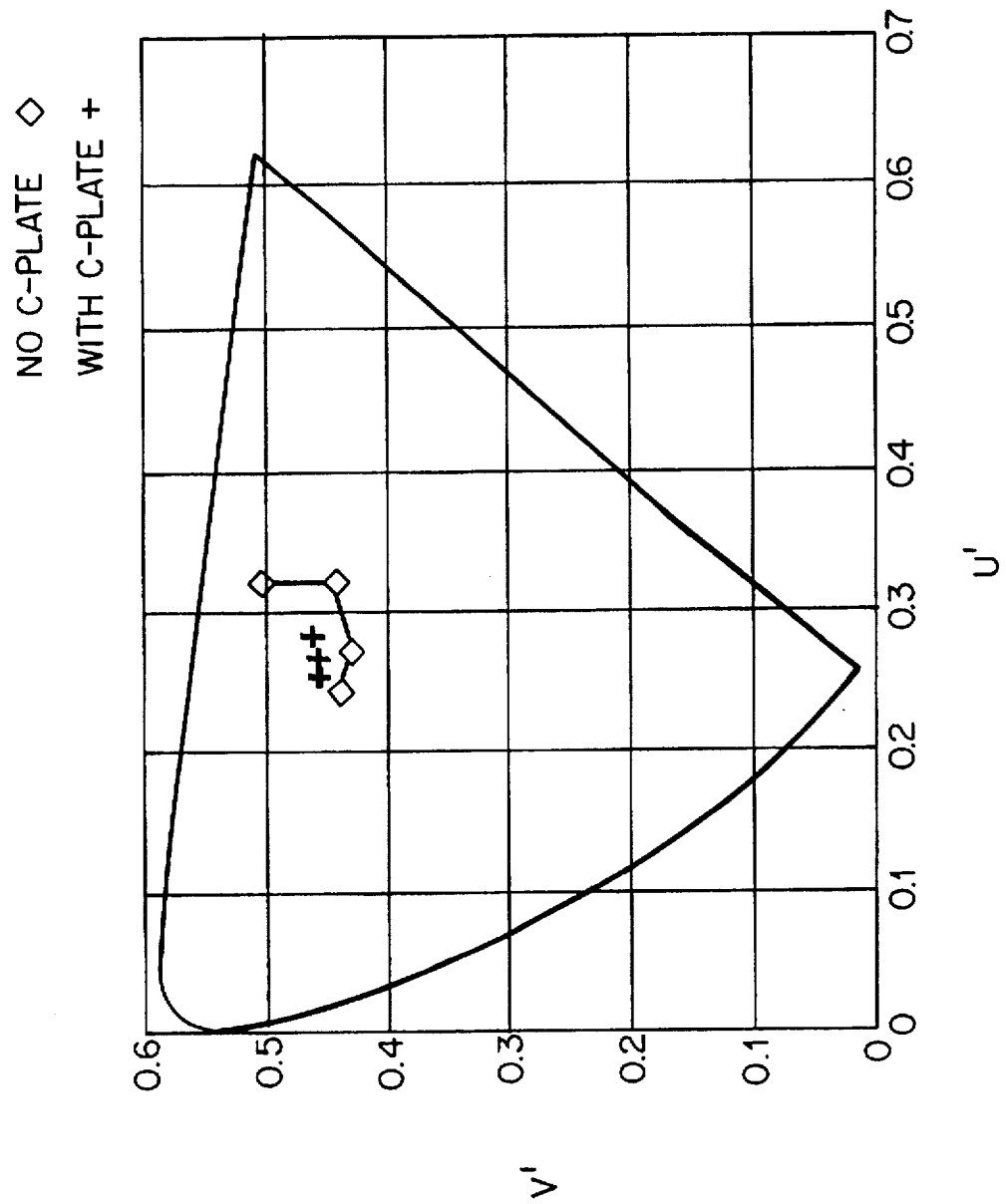
FIG. 4B is a plot comparing computer modeled trajectories of the u', v' color coordinates for a reflective polarizer having the side of the film having its longer pitch oriented toward the light source, both with and without a positively birefringent C-plate added.

FIGS. 4A and 4B show the effect of inserting a positively birefringent C-plate into an uncompensated reflective polarizer which is oriented with the longer pitch side of the cholesteric layer toward the light source. Both FIG. 4A and FIG. 4B show improved field of view performance of the compensated reflective polarizer of the present invention as compared to an uncompensated reflective polarizer. FIG. 4A shows that, with the addition of the positively birefringent C-plate, the field of view of a reflective polarizer is widened. FIG. 4B shows that, with the present invention's addition of the positively birefringent C-plate, chromaticity shifting over the field of view is reduced from chromaticity shifting over the field of view when no positively birefringent C-plate is present.

Figure 5A:
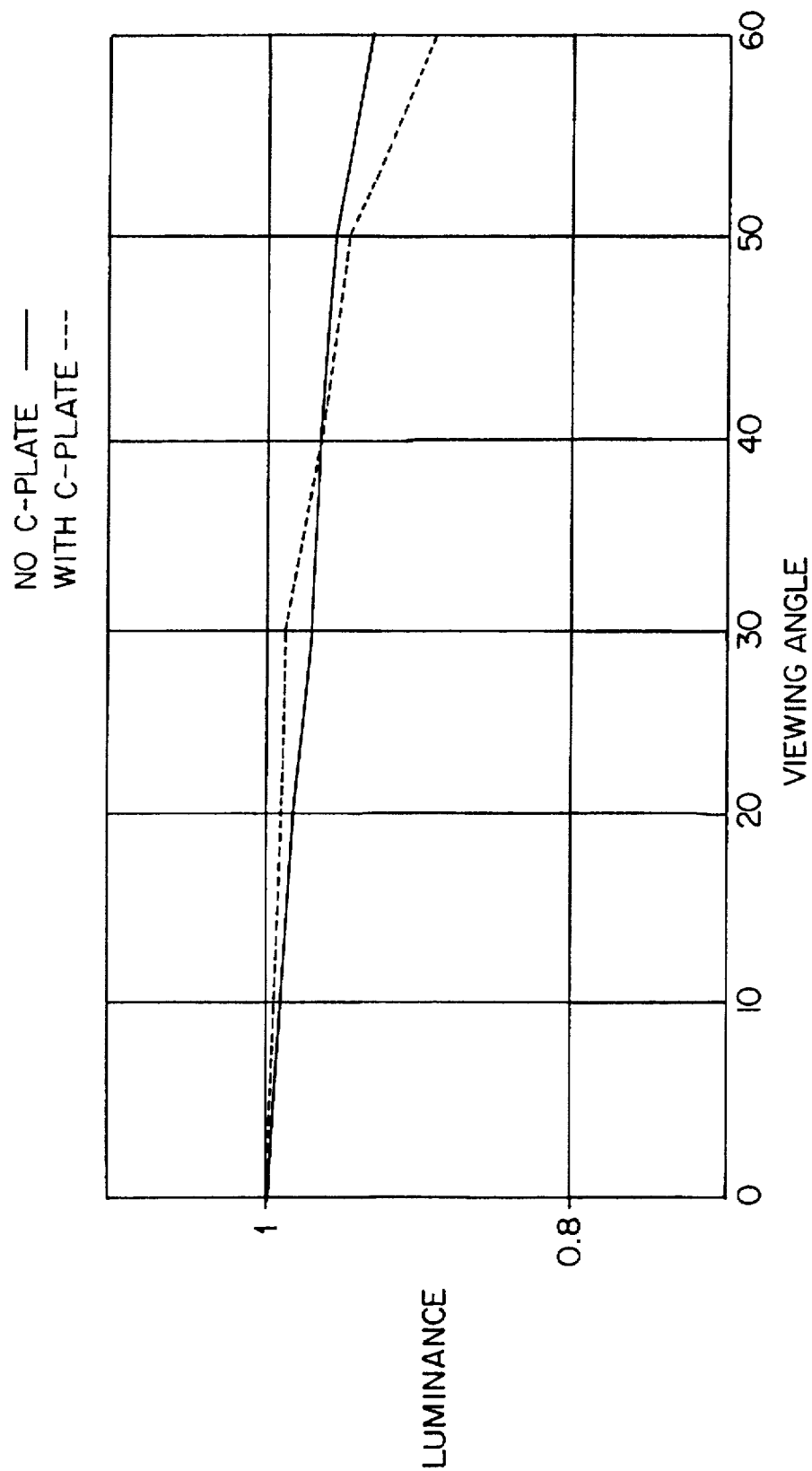
FIG. 5A is a plot comparing computer modeled calculations of transmission versus viewing angle for a reflective polarizer having the side of the film having its shorter pitch oriented toward the light source, both with and without a positively birefringent C-plate added.
Figure 5B:
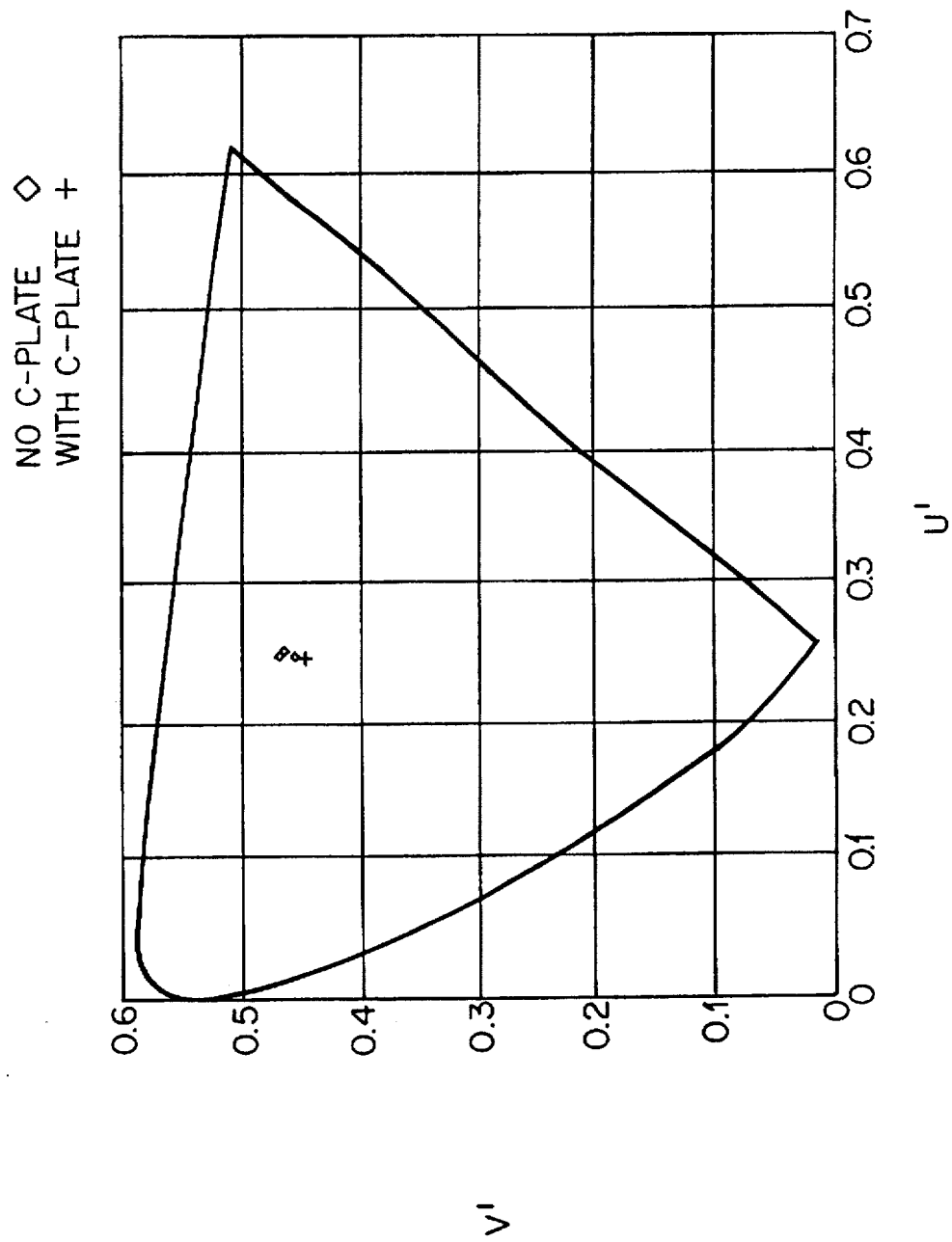
FIG. 5B is a plot comparing computer modeled trajectories of the u', v' color coordinates for a reflective polarizer having the side of the film having its shorter pitch oriented toward the light source, both with and without a positively birefringent C-plate added.

FIGS. 5A and 5B are computer simulations showing the effect of inserting a positively birefringent C-plate into a reflective polarizer which is oriented with the shorter pitch side toward the light source. Both FIG. 5A and FIG. 5B show improved performance of the invention over the field of view as compared to prior art uncompensated reflective polarizers. FIG. 5A shows that, with the addition of the positively birefringent C-plate, the field of view of the reflective polarizer of the present invention is widened slightly. The fact that the improvement is only slight is due to the fact that the computer simulations assumed that the shorter pitch side was toward the light source, which has a wider field of view than reflective polarizers having the larger pitch side toward the light source. FIG. 5B shows that the addition of a positively birefringent C-plate can virtually eliminate chromatic shifting over the field of view for the reflective polarizer having its smaller pitch side toward the lamp.

It is clear that the present invention, which is a reflective polarizer having a positively birefringent C-plate compensator positioned between the cholesteric layer and the quarter-wave plate, can achieve improved performance over a wide field of view than can a prior art uncompensated reflective polarizers. Computer simulations indicate that the device will function best if the short pitch gradient side of the cholesteric layer is oriented toward the light source. However, the present invention improves the performance of reflective polarizers having either the shorter pitch side or the longer pitch side of the cholesteric layer oriented toward the light source.

While particular embodiments of the present invention have been shown and described, it should be clear that changes and modifications may be made to such embodiments without departing from the true scope and spirit of the invention. It is intended that the appended claims cover all such changes and modifications.

We claim:

1. An optical device for transforming light comprising:
a layer of cholesteric material, the layer of cholesteric material adapted for transmitting light having a first circular helicity and reflecting light having a second circular helicity;
a quarter-wave plate positioned on a first side of the layer of cholesteric material, the quarter-wave plate having first and second oppositely oriented sides, the quarter-wave plate converting light having the first circular helicity and transmitted by the layer of cholesteric material into linearly polarized light; and
a compensator disposed between the first side of the layer of cholesteric material and the first side of the quarter-wave plate, the compensator including a positively birefringent C-plate layer.

2. The optical device of claim 1, wherein the layer of cholesteric material comprises means for introducing a first phase delay in transmitted light propagating therethrough at off normal angles.

3. The optical device of claim 2, wherein the compensator comprises means for introducing second phase delay, opposite in sign to the first phase delay, in light propagating therethrough at off normal angles.

4. The optical device of claim 3, wherein the means for introducing a first phase delay comprises a means for changing a polarization state of transmitted light having the first circular helicity from an original polarization state to a first polarization state, and wherein the means for introducing a second phase delay comprises a means for substantially restoring the polarization state of the transmitted light having the first circular helicity to the original polarization state.

5. The optical device of claim 1, and further comprising a polarizer having first and second sides, the polarizer being positioned on the second side of the quarter-wave plate such that the first side of the polarizer is adjacent to and oriented toward the second side of the quarter-wave plate.

6. The optical device of claim 5, and further comprising a display compensator having first and second sides, the display compensator being positioned on the second side of the polarizer such that the first side of the display compensator is adjacent to and oriented toward the second side of the polarizer.

7. The optical device of claim 1, wherein the positive C-plate layer of the compensator is a layer of homeotropically oriented liquid crystal molecules.

8. The optical device of claim 7, wherein the positive C-plate layer of the compensator is a layer of polymerized homeotropically oriented nematic liquid crystal molecules.

9. A liquid crystal display comprising:

a light source which radiates randomly polarized light;

a layer of cholesteric material disposed on a first side of the light source and receiving randomly polarized light from the light source, the layer of cholesteric material adapted for transmitting therethrough light having a first circular helicity and reflecting light having a second circular helicity, the layer of cholesteric material introducing a first angle dependent phase delay in the transmitted light;

a compensator disposed on a first side of the layer of cholesteric material opposite the light source, the compensator introducing a second angle dependent phase delay in the transmitted light, the second angle dependent phase delay opposite in sign from a sign of the first angle dependent phase delay;

a quarter-wave plate disposed on a first side of the compensator opposite the layer of cholesteric material, the quarter-wave plate converting the transmitted light into linearly polarized light;

a polarizer disposed on a first side of the quarter-wave plate opposite the compensator, the polarizer transmitting linearly polarized light therethrough; and a liquid crystal matrix disposed on a first side of the polarizer opposite the quarter-wave plate, the liquid crystal matrix receiving linearly polarized light from the polarizer and using the linearly polarized light to display information.

10. The liquid crystal display of claim 9, wherein the compensator, which introduces the second angle dependent phase delay, comprises means for compensating for the first angle dependent phase delay to increase transmission and chromaticity of the liquid crystal display at wide viewing angles.

11. The liquid crystal display of claim 10, wherein the layer of cholesteric material is a layer of liquid crystal cholesteric material having a pitch gradient.

12. The liquid crystal display of claim 11, wherein a side of the layer of liquid crystal cholesteric material having its shorter pitch is oriented toward the light source.

13. The liquid crystal display of claim 10, wherein the compensator includes a positively birefringent C-plate layer.

14. The liquid crystal display of claim 13, wherein the positively birefringent C-plate layer of the compensator is a layer of homeotropically oriented liquid crystal molecules.

15. The liquid crystal display of claim 13, wherein the positively birefringent C-plate layer of the compensator is a layer of polymerized homeotropically oriented nematic liquid crystal molecules.

16. The liquid crystal display of claim 13, wherein the quarter-wave plate comprises means for converting the transmitted light into linearly polarized light so that substantially none of the transmitted light will be blocked by the polarizer, thereby increasing a quantity of linearly polarized light available for use by the liquid crystal matrix in displaying information.

17. The liquid crystal display of claim 16, and further comprising:

a reflector positioned on a second side of the light source, the reflector receiving light having the second circular helicity and reflecting a substantial portion of the light as light having the first circular helicity.

* * * * *